(12) United States Patent  (10) Patent No.: US 7,900,583 B2
Simon  (45) Date of Patent: Mar. 8, 2011

(54) SLIDABLE RING BIRD TOY

(75) Inventor: David F. Simon, Lakeland, FL (US)

(73) Assignee: Caitec Corporation, Baltimore, MD (US)

( * ) Notice: Subject to any disclaimer, the term of this patent is extended or adjusted under 35 U.S.C. 154(b) by 176 days.

(21) Appl. No.: 12/197,535

(22) Filed: Aug. 25, 2008

(65) Prior Publication Data

US 2009/0050073 A1 Feb. 26, 2009

Related U.S. Application Data

(60) Provisional application No. 60/966,011, filed on Aug. 25, 2007.

(51) Int. Cl.
*A01K 29/00* (2006.01)
*A01K 15/02* (2006.01)

(52) U.S. Cl. ......... 119/707; 119/702; 119/710; 446/489; 446/124

(58) Field of Classification Search ............. 119/702, 119/706, 707, 708, 709, 710, 711, 468, 70, 119/466, 464, 465, 429, 52.2, 52.3, 57.8, 119/57.9; D30/160; 446/489, 126, 125, 446/124, 119, 102; 222/522, 523, 549; 220/4.26, 220/8

See application file for complete search history.

(56) References Cited

U.S. PATENT DOCUMENTS

| | | | | |
|---|---|---|---|---|
| 685,736 | A * | 10/1901 | Atwell | 220/8 |
| 2,379,853 | A * | 7/1945 | Smith | 222/519 |
| 2,729,361 | A * | 1/1956 | Ephron | 222/92 |
| 3,092,076 | A * | 6/1963 | Novello | 119/468 |
| 3,102,465 | A * | 9/1963 | Montesano | 99/323 |
| 3,145,690 | A * | 8/1964 | Bachman | 119/52.3 |
| 4,261,461 | A * | 4/1981 | Kizlauskas | 206/765 |
| 4,591,074 | A * | 5/1986 | Kennings | 222/153.01 |
| 5,165,363 | A * | 11/1992 | McGinty | 119/464 |
| 5,310,380 | A * | 5/1994 | Levy et al. | 446/489 |
| 5,375,558 | A * | 12/1994 | Drakos | 119/57.9 |
| D480,183 | S * | 9/2003 | McGinty | D30/160 |
| 2007/0056968 | A1* | 3/2007 | Giwargis et al. | 220/8 |
| 2007/0261644 | A1* | 11/2007 | Simon | 119/707 |

* cited by examiner

*Primary Examiner* — Andrea M Valenti
(74) *Attorney, Agent, or Firm* — Jones, Tullar & Cooper, PC

(57) ABSTRACT

A bird toy for stimulating a foraging instinct by surrounding a treat on a platform on a main body with one or more substantially transparent rings rotatable and vertically slidable on the main body. In one or more rotative positions of the ring or rings turned by a pet bird, the ring or rings are allowed to shift vertically to make the treat accessible. A bottom platform allows a more difficult test, requiring the bird to lift the ring or rings to expose a treat on the bottom platform after rotating the rings to the correct position allowing the rings to be lifted.

10 Claims, 2 Drawing Sheets

SLIDABLE RING BIRD TOY

CROSS REFERENCE TO RELATED APPLICATIONS

This application claims the benefit of U.S. provisional patent application No. 60/966,011 filed on Aug. 25, 2007.

BACKGROUND OF THE INVENTION

This invention concerns bird toys and more particularly toys which stimulate the natural foraging instinct, typically requiring a bird to manipulate the toy in order to gain access to a treat contained therein. This type of toy provides an activity similar to foraging in the wild, which is believed to be healthy for birds to engage in, particularly for intelligent birds such as macaws.

Such toys should require a significant effort to solve in order to occupy the interest in the toy over a period of time, but should not be too difficult so as to merely frustrate the bird. Such toys should also be durable to withstand the powerful beaks of these birds and yet be simple and inexpensive to produce.

It is an object of the present invention to provide a durable bird toy which excites the foraging instincts of a bird by requiring the bird to manipulate the toy to gain access to a treat placed in the toy and which is simple and inexpensive.

SUMMARY OF THE INVENTION

The above object of the invention and other objects which will become apparent upon a reading of the following specification and claims are achieved by a main body mounting one or more platforms for receiving a treat. The treat is accessible through openings in the side of the main body. A ring configured to substantially surround a treat on a platform is rotatably received on the main body and is vertically slidable thereon. One of the rings or the main body has a holding feature able to be interengaged with the other of the rings or main body to prevent the ring from shifting away from a vertical position substantially surrounding a treat placed on the platform except in one or more selected rotative positions of the ring whereat they holding feature becomes aligned with a complementary release feature on the other of said ring or main body to allow the ring to be shifted vertically to expose the treat on the platform.

In the preferred form, one or more rings are slidable on the body to a raised position surrounding a treat placed on the platform to prevent access to the treat. The ring or rings are held in this raised position by a radially projecting holding feature on the main body (or on each of the rings), such as a radially projecting tooth, engaging a surface on the rings (or on the main body). The rings are rotatable to bring a second complementary release feature such as a slot on the inside of the rings (or the outside of the main body) into alignment with the holding feature such that the ring is allowed to drop down to expose the treat.

The rings drop down to a support on the lower end of the main body located below the intermediate platform when the holding and release features such as a tooth and slot are aligned.

Appendages projecting from each ring are designed to be easily engageable with a bird's feet to facilitate manipulation of the rings.

A lower platform can also be provided on the main body for a more difficult challenge, in which the lowered rings enclose a treat placed on the lower platform requiring the bird to raise the one or more rings up in order to access a treat previously placed on the lower platform.

The rings and main body may be constructed of a tough polymer plastic and are substantially transparent so that the bird can see the enclosed treat placed on the upper or lower platform.

DESCRIPTION OF THE DRAWING FIGURES

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
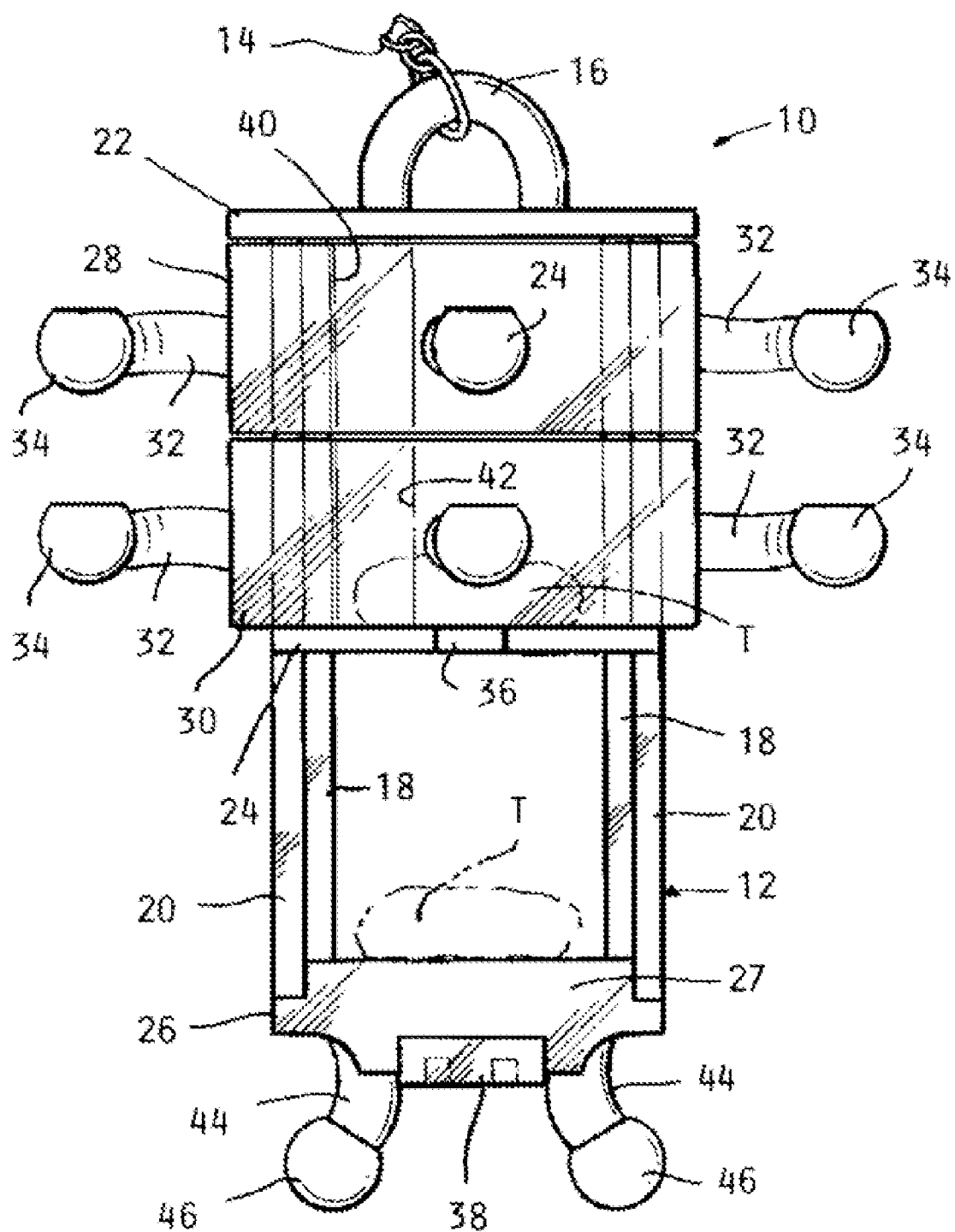
FIG. 1 is a front elevational view of a preferred embodiment of a bird toy according to the present invention with a pair of rings positioned in a raised position on a main body enclosing a treat placed on an intermediate platform included in the main body.
Figure 2:
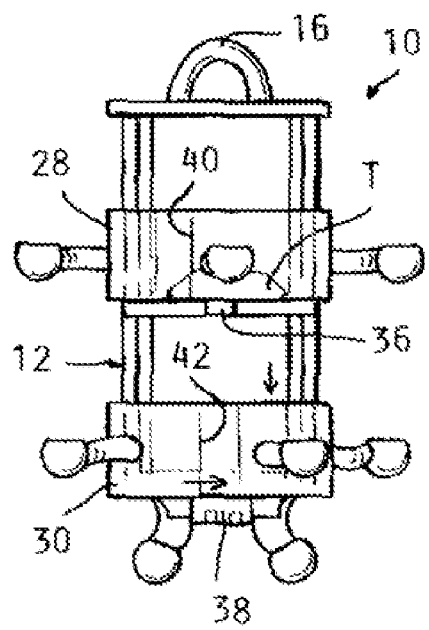
FIG. 2 is a reduced size front elevational view of the bird toy shown in FIG. 1 with first one of the pair of rings dropped to a lower position on the main body.
Figure 3:
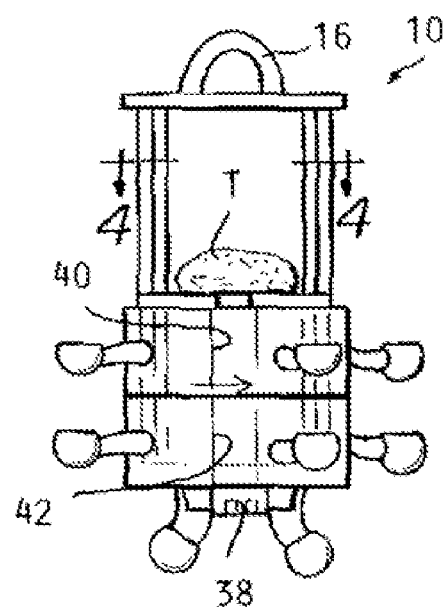
FIG. 3 is a front elevational view of the bird toy shown in FIG. 2 with a second of the pair of rings dropped down to rest on the first ring to completely expose a treat previously placed on the upper platform.
Figure 4:
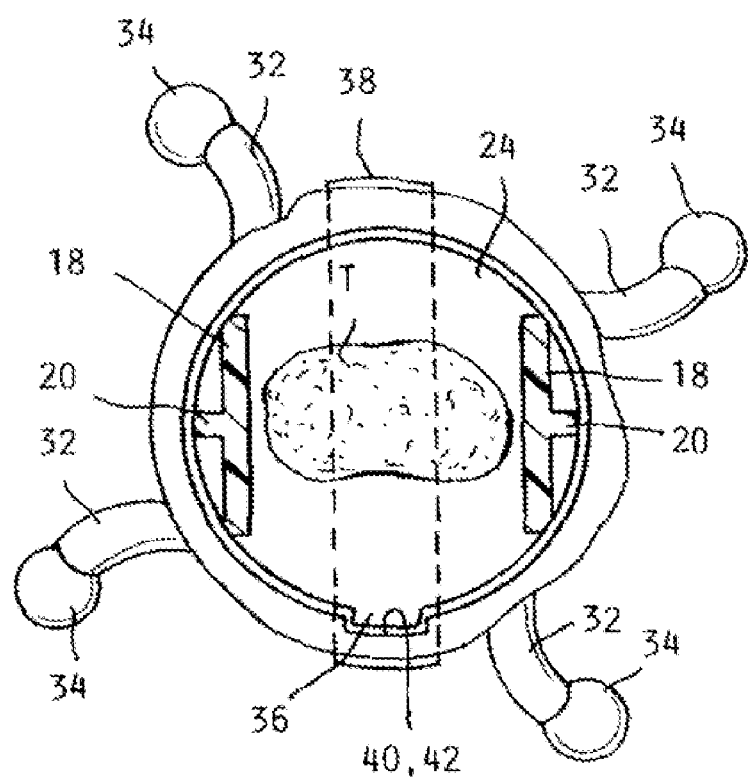
FIG. 4 is an enlarged view of the section 4-4 taken in FIG. 2.

Referring to the drawings particularly FIG. 1, a bird toy 10 according to the invention for stimulating a foraging instinct is shown having a main body 12 adapted to be suspended on a chain 14 attached to an eye 16, the chain 14 attached to a support (not shown).

The main body 12 is comprised of a pair of vertical sidewalls 18 reinforced with ribs 20 on either side, connected together with a top 22, an intermediate horizontal platform 24 and a bottom end piece 26 having a surface defining a lower horizontal platform 27.

A treat placed on the platforms 24 or 27 is accessible through openings between the sidewalls 18.

A pair of rings 28, 30 are rotatable and vertically slidable on the main body 12.

A short tooth 36 comprising a holding feature projects radially from the intermediate platform 24 and a pair of wider and longer support teeth 38 project from opposite sides of the bottom piece 26 to support the rings 28, 30 after dropping down from the level above the intermediate platform 24.

The rings 28, 30 each are formed with a respective slot 40, 42 each comprising a release feature sized and configured to be complementary to the short tooth 36 on the platform 24 so as to allow each of the rings 28, 30 to drop down when the tooth 36 is aligned with the slot 40 or 42.

Four curved appendages 32 maybe provided projecting radially from the exterior of the rings with a flattened ball end 34 facilitating gripping by a bird's foot.

Appendages 44 with ball ends 46 may also be provided on the bottom piece 26.

To set up the toy 10 for use, a treat T is placed on the intermediate platform 24, and one or both rings 28, 30 are rotated so that their slots 40, 42 are aligned with the short tooth 36 and are then raised to a position surrounding the treat T and again rotated to misalign the tooth 36 with the slots 40, 42. This causes the tooth 36 to underlie the bottom of the ring 30 perimeter to interengage the ring 30 and platform 24 to hold both rings 28, 30 in the raised position shown in FIG. 1.

The bird must rotate each ring 28, 30 to successively bring each slot 40, 42 to the aligned position with the tooth 36, resulting each of in the rings 28, 30 to successively drop down and expose the treat T to enable access by the bird.

As an alternative, the tooth and slot complementary features can be reversed, i.e., a tooth could be formed on each ring 28, 30 and a slot on the platform 24.

More than one slot (not shown) could also optionally be provided on each ring to make the toy easier to solve.

With only one ring 28 raised, the challenge is easiest, and with two rings 28, 30 raised, solution is made more difficult since each of the rings 28, 30 must be manipulated successfully.

Dropping of only one ring 30, would not expose the treat T to sufficiently allow ready access by the bird.

For an even more difficult challenge, a treat T may be placed on the horizontal lower platform 27 of the bottom end piece 26 and one or both rings 28, 30 lowered to surround the treat T, and rotated out of alignment.

The bird must then align each ring slot with the tooth 36 and raise ring 28, 30 up to expose the treat T.

The rings 28, 30 and main body 12 are preferably molded from a tough polymer plastic to be durable, which is transparent or lightly tinted to enable a bird to see the treat T when enclosed within the rings 28, 30.

The invention claimed is:

1. A bird toy for exciting a foraging instinct in a pet bird comprising:
   a main body adopted to be hung to a support, said body including a platform at an intermediate level on said main body for supporting a treat placed thereon;
   said platform accessible through one or more side openings in said main body;
   a ring configured to substantially surround said platform, and rotatably received on said body and vertically slidable thereon;
   one of said ring or said main body having a holding feature normally interengaged with the other of said ring or main body to hold said ring in a raised vertical position substantially surrounding a treat placed on said platform except in at least one selected rotative positions wherein said holding feature becomes aligned with a complementary release feature on said other of said ring or main body to allow said ring to drop down and expose said treat on said platform;
   a support feature on said main body located to engage said ring upon said ring dropping down to expose said treat on said platform, whereby a treat on said platform may be accessed by a pet bird through said one or more side openings upon successfully aligning said holding feature with said release feature.

2. The bird toy according to claim 1 wherein said holding feature on said ring or said main body comprises a projecting tooth, holding said ring in said raised vertical position and a slot when aligned with said slot by rotation of said ring allowing said ring to drop down from said position surrounding said treat on said platform.

3. The bird toy according to claim 1 wherein a second ring is movably stacked onto said first mentioned ring and is also rotatable and vertically slidable on said main body, and is normally held in a vertically raised position either by being stacked on said first mentioned ring or by engagement of a holding feature on said main body or said second ring after said first mentioned ring drops down, alignment of said holding feature in at least one or more rotative position of said second ring with a release feature allowing said second ring to also drop down below said treat placed on said platform after said first ring drops down.

4. The bird toy according to claim 1 wherein a lower platform is formed on a bottom end piece included in said main body, said ring surrounding said lower platform when dropped down from said vertical position surrounding said treat on said platform at said intermediate level on said main body, whereby a bird must lift the ring to obtain access to the treat.

5. The bird toy according to claim 1 wherein one or more appendages project out radially from said ring.

6. The bird toy according to claim 1 wherein said main structure comprises a pair of spaced apart vertical walls connected at the top by a top piece and at the bottom by a bottom piece, said platform affixed to said side walls at an intermediate level on said body.

7. The bird toy according to claim 6 wherein said top piece has an eye formed thereon for attachment of a hang chain.

8. The bird toy according to claim 6 wherein at least one appendage extends down from said bottom piece.

9. The bird toy according to claim 6 wherein said support comprises a pair of projections extending radially out from said bottom piece to support said ring upon dropping from said intermediate level.

10. The bird toy according to claim 1 wherein said ring is formed of a substantially transparent plastic.

* * * * *